2,722,432
WHEEL ADJUSTMENT FOR MOWERS

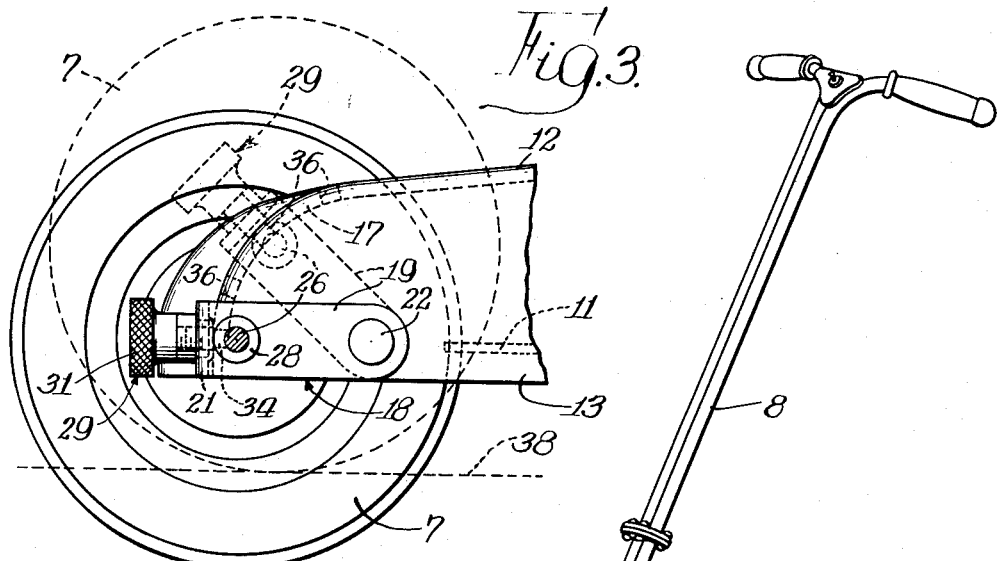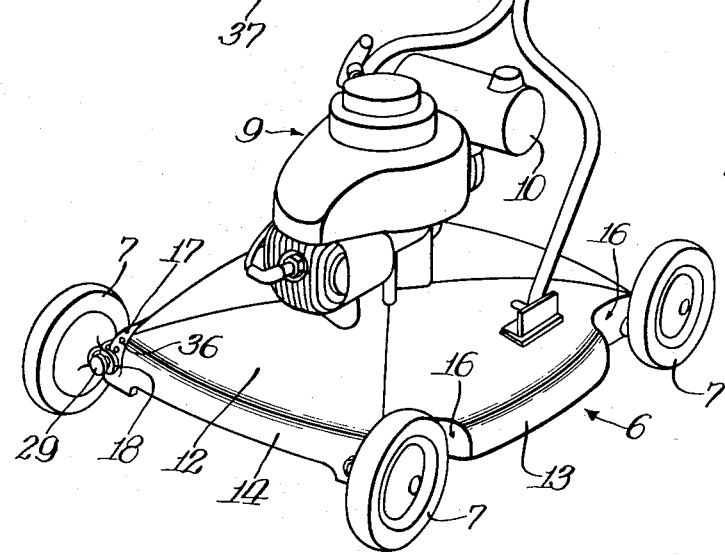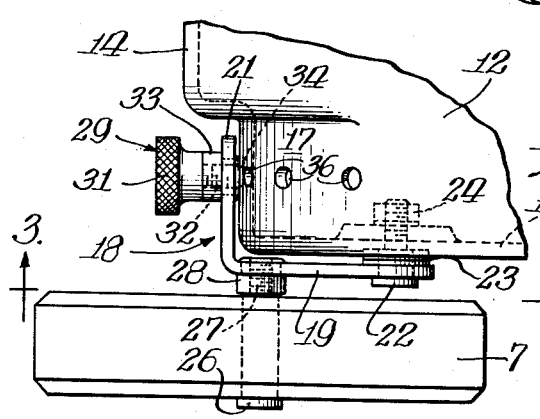

Frederic A. Roberton, Oak Park, and Harold T. Bright, Elmhurst, Ill., assignors to Robertson Manufacturing Co., a corporation of Illinois Application June 8, 1953, Serial No. 360,142

4 Claims. (Cl. 280—43)

This invention relates to mowers and particularly to a novel wheel adjustment for power mowers of the type having a disk or cutter mounted for rotation about a vertical axis.

In power mowers of the so-called disk type, a cutter or blade mechanism is mounted on a wheeled body or platform for rotation about a vertical axis. As in all mowers, it is desirable to provide some means for adjusting the elevation of the cutting mechanism relative to the ground level. In disk type mowers this has frequently been accomplished by adjustably mounting the wheels on the mower body or platform so that the body and the cutting mechanism carried thereon can be raised or lowered relative to the axes of the wheels and the ground level.

However, the adjustable wheel mounting arrangements heretofore proposed have involved several disadvantages. For example, many arrangements have been such that special tools have been required to effect the desired adjustment and in some cases the wheels have had to be completely removed and reassembled on the mower body. Other wheel mounting structures heretofore suggested, have been characterized by inadequate rigidity and bracing by reason of the adjustable nature of the wheel supports.

Accordingly, a primary object of our invention is to provide a novel and effective adjustable wheel mounting means for mowers or the like.

A further object of the invention is to provide a novel adjustable wheel mounting means for mowers and the like which is readily manipulated without the use of tools or other special equipment and which does not necessitate removal of the wheels from the mower body.

Another object of the invention is to provide a novel adjustable wheel mounting means for mowers and the like which is characterized by a high degree of longitudinal and lateral rigidity.

Other objects and advantages of the invention will become apparent from the subsequent detailed description taken in conjunction with the accompanying drawing, wherein:

Fig. 1 is a perspective view of a power mower embodying the principles of our invention;

Fig. 2 is a fragmentary top plan view of a forward corner portion of the mower illustrated in Fig. 1; and Fig. 3 is a fragmentary elevational view taken along the line 3—3 of Fig. 2 and showing the device in two different adjusted positions.

Referring first to Fig. 1, the invention is illustrated in connection with a disk type power lawn mower having a generally rectangular housing or body 6 with a plurality of wheels 7 adjustably mounted at the corners thereof, as hereinafter described in detail. An elongated operating handle 8 extends from the body 6, and an internal combustion engine or motor 9 having a fuel tank 10 is carried on the body 6. Although not shown in detail in the drawing since it forms no part of the present invention, it will be understood that a rotary disk or cutter blade is carried at the underside of the body 6 and is operatively connected with the motor 9 for rotation about a vertical axis. One of the radial blades of the cutter is seen at 11 in Fig. 3, the cutting mechanism of course being at a fixed elevation relative to the body of the mower.

The body or housing 6 has a top wall 12 and an integral depending skirt portion providing a pair of opposite disposed side walls 13 and a pair of front and rear end walls 14. The sides of the mower body 6 are recessed slightly, as at 16, at the front and rear corners thereof in order to receive the wheels 7. In addition, at each corner of the mower body 6 the top wall 12 and the adjacent end wall 14 are further recessed or depressed inwardly to a slight extent and are formed to provide a smooth curved surface 17.

For adjustably mounting the wheels 7, we provide at each corner of the body 6 an L-shaped bracket or lever 18 (Fig. 2) having an elongated leg portion 19 extending along the side 13 of the mower body and a shorter leg portion 21 extending laterally from the leg portion 19 and overlying the adjacent end of the mower body. The outer end of the leg portion 19 has a pivotal connection with the side wall 13 within the corner recess 16 such as by means of a pivot screw 22, a thrust collar 23, and a nut 24 attached to the screw 22 at the inside of the mower body. The wheel 7 is rotatably mounted on an axle or stub shaft 26 having a threaded connection 27 in a bushing 28 which is rigidly mounted on the leg portion 19 of the lever 18 adjacent the right angle bend thereof. Thus, the wheel 7 is rotatably carried on the lever 18 and at the same time is swingable in an upright plane at the side of the mower body by reason of the pivotal connection between the leg portion 19 and the mower body.

For adjusting the position of the pivotally mounted lever 18, the laterally extending leg portion 21 has an adjustable detent or locking member 29 which does not require the use of tools to effect adjustment. Thus, the locking member 29 comprises a knurled knob or finger member 31 and a threaded extension or shank 32 operatively carried in an internally threaded bushing 33 which is rigidly mounted on the leg portion 21. The inner end of the shank 32 has a reduced unthreaded end portion 34 which is adapted to be received in locking or retaining engagement in any one of a plurality of apertures 36 provided in the curved body portion 17. As will be readily apparent from Fig. 3, the curvature of the recessed body portion 17 is formed substantially about the axis of the pivot member 22 as a center. Consequently, the apertures 36 are arranged in an arc having a center substantially coincident with the axis of the pivot screw 22. By manipulating the knurled finger piece 31, the detent or retainer 29 can be screwed inwardly and outwardly of the pivotal lever 18 so that the inner projecting end 34 can be engaged with any desired one of the apertures 36. When the detent 29 is screwed completely into locking engagement, the enlarged knob portion 31 seats tightly against the bushing 33 so that the detent is retained against inadvertent loosening.

In Fig. 3, the lever 18 is shown in solid lines in its lowermost adjusted position with the detent 29 coacting with the lowermost aperture 36 and thereby retaining the mower body 6 in maximum elevated relation with respect to the wheel 7 and the ground level, indicated at 37. In dotted lines in Fig. 3, the lever 18 is shown in adjusted position with the detent 29 operatively coacting with the next to the highest aperture 36 so that the mower body 6 is retained at a lower elevation with respect to the axis of the wheel 7 and the ground level, indicated at 38.

From the foregoing, it will readily be seen that by providing the angular pivotal lever arrangement for mounting the wheels at the four corners of the mower body, adjustment of the elevation of the body and the cutting mechanism carried thereon relative to the ground level can be accomplished quite rapidly and in a very simple manner which does not require the use of tools or the removal of the wheels. One of the very important advantages of our invention resides in the angular configuration of the lever 18 which is preferably a right angle or L-shaped member. By this arrangement, one portion of the pivot lever is disposed adjacent the side of the mower body while the other portion thereof extends laterally and inwardly of the mower body. When the lever 18 is retained or locked in desired adjusted position, it will be seen that both ends of the lever are rigidly retained by the mower body, the end of the leg portion 19 having a more or less permanent pivotal connection and the end of the leg portion 21 having a readily detachable connection with the mower body.

In this way a high degree of rigidity and both longitudinal and lateral bracing of the lever 18 is provided and the invention thereby overcomes one of the more serious disadvantages of certain of the adjustable wheel mounting arrangements heretofore suggested in the mower art. The projecting inner end 34 of the detent 29 being received within the apertures 36 in the mower body, a highly effective degree of lateral bracing is provided while at the same time the wheel 7 is retained in desired vertically adjusted relation. Thus, the wheels 7 have a firm and rigid mounting in spite of the simple adjustability thereof.

Although the invention has been described with particular reference to a certain specific structural embodiment thereof, it is to be understood that various modifications and equivalent arrangements may be resorted to without departing from the scope of the invention as defined in the appended claims.

We claim:

1. In a power mower having a generally rectangular body and a plurality of wheels, adjustable wheel-mounting means comprising a generally L-shaped lever mounted at a corner of said body and having one leg portion thereof extending along the side of said body, pivot means at the end of said one leg portion having a pivotal connection with the side of said body, a wheel rotatably mounted on said one leg portion and adapted to swing in an upright plane at the side of the mower body upon swinging movement of the lever about said pivot means, said body having an end portion curved about an axis substantially coincident with the axis of said pivotal connection and said lever also having its other leg portion extending laterally from said one leg portion along the curved end of the mower body and overlying the same, and adjustable retaining means carried by said other leg portion and coacting with said curved end portion for retaining the lever in desired pivotally adjusted position whereby to permit adjustment of the elevation of said body relative to said wheel.

2. In a power mower having a body and a plurality of wheels, adjustable wheel-mounting means comprising a lever having an elongated mounting portion at one end thereof and a laterally extending adjusting portion at the opposite end thereof, pivot means operatively connecting the end of said mounting portion to the side of the mower body with the adjusting portion of the lever extending along the adjacent end portion of the mower body, a wheel rotatably supported on the mounting portion of said lever whereby to permit swinging of the wheel in an upright plane at the side of the mower body upon pivotal movement of said lever, said adjacent end portion of said body being curved to accommodate pivotal movement of said lever and being provided with a plurality of apertures, and an adjustable detent carried by the adjusting portion of said lever and adapted to extend into said apertures for retaining the lever in desired pivotally adjusted position whereby to permit adjustment of the elevation of said body relative to said wheel.

3. In a power mower, a housing with a top wall and a depending skirt portion, an angular lever having an elongated side leg pivotally connected to said skirt portion at the side of said housing and a laterally extending end leg projecting inwardly from said side leg and overlying said skirt portion at the end of the housing, a wheel rotatably mounted on said side leg for swinging in an upright plane at the side of the housing upon pivotal movement of said lever, said skirt portion at the end of said housing adjacent said end leg having a curvature about a center substantially coincident with the pivotal axis of said side leg and being provided with a plurality of apertures along said curvature, and an adjustable detent carried by said end leg and adapted to extend into said apertures for retaining the lever in desired pivotally adjusted position whereby to permit adjustment of the elevation of said housing relative to said wheel.

4. The device of claim 2 further characterized in that said detent comprises a member threadedly mounted in said adjusting portion and having an enlarged portion adapted to seat operatively against said lever when screwed into retaining position.

References Cited in the file of this patent

UNITED STATES PATENTS

| | | |
|---|---|---|
| 1,392,874 | Johnston | Oct. 4, 1921 |
| 2,174,415 | Curtis | Sept. 26, 1939 |